United States Patent
Jiang et al.

(10) Patent No.: US 8,202,392 B2
(45) Date of Patent: Jun. 19, 2012

(54) PROCESS FOR APPLYING A COATED OR UNCOATED FILM ON A LENS SUBSTRATE

(75) Inventors: Peiqi Jiang, St. Petersburg, FL (US); Steven Weber, St. Petersburg, FL (US); Haipeng Zheng, St. Petersburg, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 158 days.

(21) Appl. No.: 12/278,494

(22) PCT Filed: Aug. 5, 2008

(86) PCT No.: PCT/EP2008/060301
§ 371 (c)(1),
(2), (4) Date: Feb. 16, 2010

(87) PCT Pub. No.: WO2009/019276
PCT Pub. Date: Feb. 12, 2009

(65) Prior Publication Data
US 2010/0163165 A1    Jul. 1, 2010

Related U.S. Application Data

(60) Provisional application No. 60/954,723, filed on Aug. 8, 2007.

(51) Int. Cl.
| | |
|---|---|
| *C09J 5/02* | (2006.01) |
| *C09J 5/04* | (2006.01) |
| *C09J 5/06* | (2006.01) |
| *C08J 5/12* | (2006.01) |
| *B32B 37/06* | (2006.01) |
| *B32B 37/10* | (2006.01) |
| *B32B 37/12* | (2006.01) |
| *B32B 37/24* | (2006.01) |
| *B29C 65/52* | (2006.01) |
| *B29C 65/54* | (2006.01) |
| *B32B 38/18* | (2006.01) |

(52) U.S. Cl. ............... 156/306.9; 156/230; 156/237; 156/244.12; 156/244.22; 156/273.3; 156/273.7; 156/275.5; 156/307.1; 156/307.3; 156/307.5; 427/162; 427/164

(58) Field of Classification Search .............. 156/230, 156/237, 242, 244.12, 244.22, 272.2, 273.3, 156/273.7, 275.5, 306.9, 307.1, 307.3, 307.5; 427/162, 164
See application file for complete search history.

(56) References Cited

U.S. PATENT DOCUMENTS

| | | | | |
|---|---|---|---|---|
| 2,372,929 | A | * | 4/1945 | Blessing .................. 428/164 |
| 5,128,388 | A | | 7/1992 | Komori et al. .............. 522/95 |
| 6,503,631 | B1 | * | 1/2003 | Faverolle et al. ........... 428/447 |
| 6,562,466 | B2 | | 5/2003 | Jiang et al. ................ 428/412 |
| 7,935,212 | B2 | * | 5/2011 | Jiang et al. .............. 156/273.3 |
| 7,988,811 | B2 | * | 8/2011 | Kurimura et al. ........... 156/332 |
| 7,993,482 | B2 | * | 8/2011 | Begon et al. ............. 156/307.5 |
| 2006/0219347 | A1 | | 10/2006 | Begon et al. ................ 156/230 |

* cited by examiner

*Primary Examiner* — Sonya Mazumdar
(74) *Attorney, Agent, or Firm* — Fulbright & Jaworski LLP

(57) ABSTRACT

Processes for applying a coated or uncoated film onto at least one geometrically defined surface of a lens substrate which comprises: providing a liquid hot melt adhesive (HMA) composition; providing a film having two opposite main surfaces; providing a lens substrate having at least one geometrically defined surface; and applying the film to the lens substrate surface using the HMA.

32 Claims, 1 Drawing Sheet

PROCESS FOR APPLYING A COATED OR UNCOATED FILM ON A LENS SUBSTRATE

This application is a national phase application under 35 U.S.C. §371 of International Application No. PCT/FR2008/060301 filed 5 Aug. 2008, which claims priority to U.S. Provisional Application No. 60/954,723 filed on 8 Aug. 2007. The entire text of each of the above-referenced disclosures is specifically incorporated herein by reference without disclaimer.

BACKGROUND OF THE INVENTION

1. Field of the Invention

The present invention relates to an improved process or method for transferring at least one coating or laminating a coated or uncoated film onto at least one geometrically defined surface of a lens substrate, which can be implemented in a short period of time without any risk of deformation of the lens substrate, and results in the coating or the coated or uncoated film adhering to the lens substrate through an adhesive layer of uniform thickness.

Furthermore, the process or method of the invention allows transferring a coating or laminating a coated or uncoated film on a rough surface of a lens substrate, i.e. a surface of a lens substrate that has been surfaced and fined but not polished or a surface which has been surfaced (cut) (typically by digital surfacing) and not polished.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are designated in general as functional coatings.

Thus, it is usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat), an anti-reflection coating and, optionally, an anti-fouling top coat. Other coatings such as a polarized coating, a photochromic or a dyeing coating may also be applied onto one or both surfaces of the lens substrate.

Numerous processes and methods have been proposed for coating a surface of an ophthalmic lens and are disclosed.

U.S. Pat. No. 6,562,466 describes one process or method for transferring a coating from at least one mold part onto at least a geometrically defined surface of a lens blank comprising:

providing a lens blank having at least one geometrically defined surface;

providing a support or mold part having an internal surface bearing a coating and an external surface;

depositing on said geometrically defined surface of said lens blank or on said coating a pre-measured amount of a curable adhesive composition;

moving relatively to each other the lens blank and the support to either bring the coating into contact with curable adhesive composition or bring the curable adhesive composition into contact with the geometrically defined surface of the lens blank;

applying a sufficient pressure onto the external surface of the support so that the thickness of a final adhesive layer once the curable composition cured is less than 100 micrometers;

curing the layer of adhesive composition; and withdrawing the support or mold part to recover the lens blank with the coating adhered onto the geometrically defined surface of said lens blank.

U.S. Pat. No. 6,562,466 uses a liquid light or thermal curable adhesive composition to transfer the coating layers from the carrier to the surface of the lens substrate. The liquid curable adhesive composition is required to stick both to the exposed coating on the carrier and the geometrically defined surface of the lens substrate. The process requires to precisely dropping the liquid adhesive composition, either too much or too less of the liquid adhesive needs to be avoided, which renders the process more complicated and less cost effective. Furthermore, this process may cause optical distortions when the liquid adhesive composition is not spread out very evenly on the lens curved surface, especially when the lens surface has multiple curves. In particular, when the liquid adhesive composition is spread using air pressure (inflatable membrane apparatus) applied on a flexible coating carrier, the applied pressure may not usually be uniform over the whole carrier surface, resulting in an uneven spreading of the liquid adhesive composition and a final cured adhesive layer having some variations in thickness.

Published US patent application no 2006-0219347 discloses a process or method for transferring at least one coating from a carrier onto a geometrically defined surface of a lens substrate which comprises the steps of:

(a) obtaining a carrier having a main surface bearing at least one functional coating;

(b) obtaining a lens substrate having at least one geometrically defined surface;

(c) depositing, either on said at least one functional coating or said at least one geometrically defined surface of the lens substrate, a layer of an adhesive composition;

(d) bringing said layer of adhesive composition to a state at which the layer becomes unflowable under the process conditions if said layer is not already in such a state at the end of step (c);

(e) moving the carrier and the lens substrate relatively to each other to bring the layer of the adhesive composition into direct contact with either said at least one geometrically defined surface of the lens substrate or said at least one functional coating;

(f) pressing together the layer of the adhesive composition and either said at least one functional coating or said at least one geometrically defined surface of the lens substrate;

(g) optionally, applying heat during pressing step (f);

(h) stopping pressing step (f); and (i) withdrawing the carrier to recover the lens substrate coated with said at least one functional coating adhering to said at least one geometrically defined surface through the layer of transparent adhesive composition.

The adhesive composition is selected from the group consisting of pressure-sensitive adhesives (PSA) and hot-melt adhesives (HMA).

Nevertheless, there is still a need for a better control of the thickness of the adhesive layer and minimizing the thickness variation of the adhesive layer on the entire substrate surface. There is also still a need of a better covering of a lens substrate rough surface, i.e. a surface that has been surfaced and fined, but not polished, by the adhesive layer, the adhesive material filling up the surface irregularities or a lens substrate that has been surfaced by digital surfacing but not polished.

Besides, there is also a need to improve final product performance, such as thermal resistance.

U.S. Pat. No. 5,128,388 discloses a hot melt adhesive (HMA) crosslinkable by UV irradiation comprising a hot melt adhesive base, a saturated hydrocarbon oligomer containing at least on acryloyl group in a molecule for affording crosslinkability by ultraviolet irradiation, and a photopolymerization initiator. The HMA base is a block thermoplastic elastomer comprising polystyrene blocks and polybutadiene, or polyisoprene or ethylene-butylene copolymer blocks.

U.S. Pat. No. 5,128,388 also discloses a process for preparing an optical disc which comprises applying the UV crosslinkable HMA on one of a pair of substrates, irradiating with UV radiation the applied HMA, and then putting the other substrate onto the surface of HMA.

SUMMARY OF THE INVENTION

Therefore, one object of the invention is to provide a process or method for transferring a coating or laminating a coated or uncoated film onto a geometrically defined surface of a lens substrate which results in a coated lens substrate wherein the coating or the coated or uncoated film (s) adhere(s) to the lens substrate surface through an adhesive layer of very uniform thickness to fully respect the lens optical design.

A further object is to provide a process or method as above which also allows transferring a coating or laminating a coated or uncoated film onto a rough surface of lens substrate.

Another object is to improve final lens substrate performances, especially thermal resistance.

According to the invention there is provided a process for applying a coated or uncoated film onto at least one geometrically defined surface of a lens substrate which comprises the steps of:
  (a) providing a liquid hot melt adhesive (HMA) composition comprising:
    1. at least one HMA base polymer having a glass transition temperature Tg and optionally a melting temperature Tm, with Tg<Tm;
    2. at least one polymerizable monomer, oligomer or polymer, more preferably UV polymerizable; and
    3. optionally at least one liquid solvent compatible with both said at least one polymer and said at least one polymerizable monomer, oligomer or polymer;
  (b) providing a film having two opposite main surfaces: a first main surface optionally bearing at least one functional coating and a second main surface;
  (c) providing a lens substrate having at least one geometrically defined surface;
  (d) applying the liquid HMA composition onto either the surface of said film or said at least one geometrically defined surface;
  (e) drying the applied liquid HMA composition to form a HMA dried layer in contact with said at least one of the main surfaces of said film or said at least one geometrically defined surface of the lens substrate;
  (f) moving the film and the lens substrate relatively to each other to bring the HMA dried layer into contact with either said at least one geometrically defined surface of the lens substrate or one of said main surfaces of said film;
  (g) applying a pressure on the film;
  (h) heating to reach a $T_{max\ process}$ Temperature at or above the glass transition temperature Tg but below the melting temperature Tm, if the polymer exhibits a Tm, the monomers or oligomers being liquid at the $T_{max\ process}$ temperature;
  (i) polymerizing the monomers, oligomers or polymers while maintaining pressure and heating;
  (j) removing the pressure applied on the carrier, and recovering the lens substrate with the film adherent to said lens substrate main surface.

In the process of the invention $T_{max\ process}$ is preferably lower than 130° C., preferably lower than 120° C., more preferably lower than 110° C., and even better lower or equal to 90° C.

In the present invention the term "polymer" is intended to cover both homopolymers and copolymers.

In the present invention the glass transition temperatures (Tg) and the melting temperature (Tm) are determined by differential scanning calorimetry (DSC).

Preferably, the HMA base polymer is a thermoplastic polymer.

Preferably also, the HMA base polymer has a Tg ranging from −60° C. to 90° C., more preferably from 0° C. to 90° C., better from 40° C. to 90° C.

Also preferably, the HMA base polymer has a Tg<80° C.

In a preferred embodiment of the present invention, the first main surface of said film bears at least one functional coating.

In a more preferred embodiment, in steps d) to f), the main surface of said film is the second main surface and the resulting lens substrate has the following structure, in this order: lens substrate/HMA cured layer/film/functional coating.

In another and preferred embodiment of the process of the invention, the main surface of the film, preferably a flexible film or carrier, bears a stack of at least one, preferably several functional coatings which are transferred onto the lens substrate. Of course, the coatings are then applied on the surface of the carrier in the reverse order with regard to the desired order of the coating stack on the lens substrate.

In this latter embodiment step d) comprises applying the liquid HMA composition onto either said at least one geometrically defined surface of the lens substrate or said functional coating of said first main surface of said film.

Preferably, step d) comprises applying the liquid HMA composition onto said functional coating of said first main surface of said film.

The process of the invention then comprises an additional step k) of withdrawing the film or carrier to recover the lens substrate coated with at least one functional coating adhering to said at least one geometrically defined surface through a HMA cured layer.

The word "carrier" will be used instead of "film" in the rest of the specification, when addressing the transfer process.

Preferably, the at least one functional coating is transferred or the coated or uncoated film laminated on a geometrically defined surface of the rear surface of the lens substrate.

In such a case, the coating transfer process is referred to as a BST (back side transfer) process. Of course, geometrically defined surfaces of front surface or both rear and front surface of the lens substrate can be coated using the process of the invention. The rear surface (generally the concave surface) of the lens substrate is the surface of the lens substrate which, in use, is the closest to the wearer's eye. The front surface (generally the convex surface) of the lens substrate is the surface of the lens substrate which, in use, is the farthest from the wearer's eye.

The ophthalmic articles which can be treated by the process of the invention are finished or semi-finished articles preferably comprising a transparent polymer substrate.

The geometrically defined surface of the lens substrate to be coated in this invention may be a spherical, toric or progressive surface, provided that an adequate spherical deformable or flexible film is employed.

The present invention also encompasses the case in which the HMA composition layer is pre-deposited and dried to a state at which the layer is unable to flow, either on a functional coating borne by the first main surface of a film or the second main surface of said film or on a geometrically defined surface of a lens substrate, which may be stored and later used in the process steps of the invention.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

The following description will relate more specifically to the embodiment on the coating transfer, i.e. when the HMA curable glue is in contact with the coating to be transferred and the film, called a carrier, is withdrawn at the end of the process to recover the lens substrate coated with said at least one functional coating adhering to the at least one geometrically defined surface through a HMA cured layer.

Figure 1A:
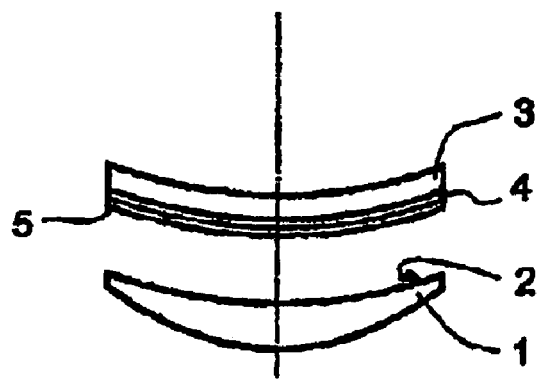
Figure 1B:
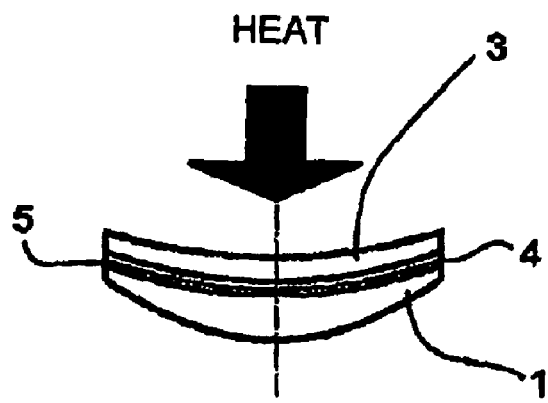

However, the same process conditions and HMA curable glue can be used for the lamination embodiment wherein the HMA curable glue is in contact with the second main surface of the film opposite to the first main surface of the film comprising the functional coating.

FIGS. 1A to 1D are schematic views of the main steps of a first embodiment of the process of the invention for transferring at least one coating onto at least one geometrically defined surface of a lens substrate, in which the layer of a HMA composition is deposited on at least one functional coating.

DETAILED DESCRIPTION OF THE INVENTION AND PREFERRED EMBODIMENTS

In this patent application, when one refers to the base curvature of the carrier, one means the base curvature of the working surface of the carrier, that is to say the surface which bears the coatings to be transferred to the geometrically defined surface of the lens substrate, after withdrawal of the carrier.

In the same way, base curvature of the lens substrate means the base curvature of the surface which bears the coatings that are going to be transferred. In this application, the base curvature has the following definition:

For a spherical surface, having a radius of curvature R, base curvature (or base)=530/R (R in mm). Such a definition is quite classical in the art.

For a toric surface: a toric surface has two principal meridians, of radii R and r with R>r, and it is possible to calculate two base curvatures BLR and BLr (BLR<BLr) corresponding respectively to radii of curvature R and r defining the toric surface.

The base curvature (or base) is defined as the ratio 530/ radius of curvature (in mm). Thus, $$BLR = \frac{530}{R} \text{ and } BLr = \frac{530}{r}$$

with R and r in mm.

Preferably, the carrier used in the present invention has a spherical shape and has a base curvature BC.

Base curvatures BLR and BLr of the above toric surface and the base curvature of the carrier BC preferably shall satisfy the following relationships:

a) if $BLr-BLR \leq 3.5$ $0<BC-BLR<3$ and $|BC-BLr|<1$ preferably:

$0.2<BC-BLR<2.5$ and $|BC-BLr|<0.5$ b) if $BLr-BLR>3.5$ $BLR<BC<BLr$

When using a rigid carrier, preferably the base curvature of the carrier is the same as the base curvature of the lens substrate.

Preferably, when moving relatively to each other the carrier and the lens substrate, the pressure is applied first on the center part of the carrier and in a second step the pressure is radially increased towards the periphery of the lens substrate.

In the case of a flexible carrier and a coating transfer on the back surface of the lens substrate, the convex front face of the carrier may have a shorter radius of curvature than the concave surface of the lens substrate to be coated.

The pressure is applied at the center and the carrier is then deformed to conform to the geometrically defined surface of the lens substrate.

The diameter of the carrier could be either higher than the diameter of the lens blank or smaller than the diameter of the lens blank.

The lens substrate for use in the present process can be any transparent substrate, preferably any plastic material transparent substrate commonly used in the optical field. The lens substrate is generally a lens or lens blank, preferably an ophthalmic lens or lens blank, more preferably a lens blank. The main faces of an ophthalmic lens blank, such as a lens blank made of a transparent plastic material, are classically subjected to a surface mechanical treatment.

This mechanical treatment comprises a group of operations leading to the production of a lens blank, the main faces of which are perfectly polished and have the desired curvatures (optical powers).

The mechanical treatment typically comprises three successive steps: grinding, fine grinding (also called fining) and polishing.

Grinding is a mechanical processing step intended to create the curvature on the face of the lens blank.

Fine grinding (fining), performed after grinding further changes the geometry of the treated face of the lens blank but can lead to a translucent lens blank, the treated face of which still shows significant surface roughness.

Finally, the polishing, a relatively long mechanical processing step, which usually does not change the geometry of the treated face, removes the remaining roughness as far as possible to give the final transparent lens blank. The lens substrate used in the present invention may be polished or only fined without being polished.

The lens blank used in the present invention can be a finished lens, i.e. a lens obtained in its definitive shape, having both of its main faces surfaced or cast to the required geometry. It is generally produced by pouring polymerizable compositions between two molds exhibiting required surface geometries and then polymerizing. The lens blank can also be a semi-finished lens, i.e. a lens which comprises after molding only one of its main faces surfaced or cast to the required geometry, and wherein preferably one face of the lens, preferably the front face of the lens, has previously been treated with an appropriate coating (anti-reflection, hard coat, primer coating, impact resistant coating, etc. ... ) and the remaining face, preferably the rear face of the lens, is coated using the process of the invention. Its second face has then to be surface-finished as required. The lens blank can also be a polarized lens or a photochromic lens.

The geometrically defined surface of the lens substrate (preferably the rear (concave) surface) on which the coatings are to be transferred may be a spherical, toric or progressive surface. By geometrically defined surface of the lens substrate there is meant either an optical surface, that is a surface of required geometry and smoothness or a surface having a required geometry but that still exhibits some roughness, such as a surface that has been grinded and fined, but not polished.

The invention may advantageously be used to transfer a coating or laminate a coated or uncoated film on a lens that has been directly surfaced but not fined and not polished.

Such surfacing process is typically called digital surfacing or direct surfacing or free form surfacing.

Contrary to traditional lens surfacing tools which have either spherical or cylindrical surfaces and can work only on the backside of the lens, digital, freeform or direct surfacing makes it possible to grind the front, back or both sides of a lens blank as needed to produce sophisticated lens designs.

Digital surfacing uses a means able to cut the surface locally, typically a diamond based knife.

Typically, a computer numerically controlled (CNC) freeform generator creates the lens surface according to the desired parameters, which may include optics, influencing variables beyond the usual sphere, cylinder and axis of the prescription.

Once the surface has been "digitally" cut, there is generally no necessity of a fining step.

The lens is then polished, typically using a computer controlled soft sponge system to ensure optimal clarity is achieved while maintaining the integrity of the surface curves.

Typical CNC machines are those provided by the Schneider company under the trade name HSC (High Speed Cutting), for example HSC100.

The state of the surface of a lens substrate being fined without being polished can also be expressed in terms of Rq.

Typically, the Rq of the fined face (traditional surfacing process) is above or equal to 0.01 µm, and preferably ranges from 0.01 µm to 1.5 µm, more preferably from 0.05 to 1.0 µm.

The Rq of a surface after digital surfacing, without fining and before polishing is generally higher than 0.05 µm and less than 1 µm, and preferably less than 0.6 µm and even better less than 0.4 µm.

Typically, the surface roughness Rq of the polished face of a lens blank is under 0.01 µm, preferably around 0.005 µm.

Rq is determined as follows:

A TAYLOR HOBSON FTS (From Talysurf Series 2) profilometer/roughness measuring systems is advantageously used to determine the root-mean-square profile height Rq (2DRq) of the surface (also referred as roughness Rq before). The system includes a laser head (product reference 112/2033-541, for example) and a 70 mm long feeler (product reference 112/1836) having a 2 mm radius spherical/conical head. The system measures a two-dimensional profile in the chosen section plane to obtain a curve Z=f(x). The profile is acquired over a distance of 20 mm. Various surface characteristics can be extracted from this profile, in particular its shape, undulation and roughness.

Accordingly, to determine Rq, the profile is subject to two different processes, namely shape extraction and filtering, which corresponds to mean line extraction.

The various steps for determining a parameter Rq of this kind are as follows:
acquisition of the profile Z=f(x),
shape extraction,
filtering (mean line extraction), and
determination of parameter Rq.

The profile acquisition step consists in moving the stylus of the aforementioned system over the surface of the lens in question, to store the altitudes Z of the surface as a function of the displacement x. In the shape extraction step, the profile obtained in the previous step is related to an ideal sphere, i.e. a sphere with minimum profile differences relative to that sphere. The mode chosen here is the LS arc mode (best circular arc extraction). This provides a curve representative of the characteristics of the profile of the surface in terms of undulation and roughness. The filtering step retains only defects corresponding to certain wavelengths. The aim is to exclude undulations, a form of defect with wavelengths higher than the wavelengths of defects due to roughness. Here the filter is of the Gaussian type and the cut-off used is 0.25 mm.

Rq is determined from the curve obtained using the following equation:

$$Rq = \sqrt{\frac{1}{N}\sum_{n=1}^{N}(Zn)^2}$$

Where Zn is, for each point, the algebraic difference Z relative to the mean line calculated during filtering.

The surface of the lens substrate can be a naked surface, i.e. a surface free of any deposited coating layer, or it can be a surface already covered with one or more functional coating layers, in particular a primer coating layer.

Although the lens substrate can be made of mineral glass or organic glass, it is preferably made of organic glass. The organic glass can be either thermoplastic materials such as polycarbonates and thermoplastic polyurethanes or thermosetting (cross-linked) materials such as diethylene glycol bis (allylcarbonate) polymers and copolymers (in particular CR 39® from PPG Industries), thermosetting polyurethanes, polythiourethanes, polyepoxides, polyepisulfides, poly (meth)acrylates, polythio(meth)acrylates, as well as copolymers thereof and blends thereof. Preferred materials for the lens substrate are polycarbonates and diethylene glycol bis (allylcarbonate) copolymers, in particular substrates made of polycarbonate.

The geometrically defined surface of the lens substrate to be coated is preferably pretreated to promote adhesion of the adhesive composition layer. Any physical or chemical adhesion promoting pretreatment step can be used such as a solvent treatment, a NaOH treatment or a corona discharge treatment. Preferably the geometrically defined surface of the lens substrate to be coated is pretreated by corona discharge.

The layer of adhesive composition is either formed on the coating or stack of coatings borne by the carrier, or on the geometrically defined surface of the lens substrate on which the coatings are transferred, preferably on the coating or stack of coatings of the carrier.

An important feature of the process of the invention is that the layer of a HMA composition is brought to a state at which the layer becomes unflowable under the process conditions. This means that, at least before moving step (f) and pressing step (g), the HMA composition layer has been dried to a hardened state such that the layer will not be significantly spreadable, in particular under the pressing and heating steps of the invention process. Although the thickness of the HMA composition layer in the (final) recovered coated lens substrate may be very slightly different from the thickness of the dry HMA composition layer as initially deposited on the functional coating or the geometrically defined surface of the lens substrate, the hardened (unflowable) state of the HMA layer is such that the layer, when pressed and heated during the process, cannot flow over the lens substrate surface.

Another important feature is that there is a direct contact between the layer of dried HMA composition and the surface that will come into contact with the dried HMA layer. In particular, there is no liquid layer, especially no water based liquid between the layer of dried HMA composition and the surface that will come into contact with the adhesive layer.

In a preferred embodiment, the process of the invention provides a recovered coated lens substrate, in which the layer of dried HMA composition is of uniform thickness. By uniform thickness, it is meant a substantially constant thickness over the entire layer area, such that variation of thickness of the layer has no consequence on the optical power of the final lens.

More precisely, thickness of a layer can be considered as uniform, when the thickness difference between the maximum thickness and the minimum thickness of the layer is not more than 2.0 μm, preferably not more than 1.0 μm and more preferably not more than 0.65 μm whatever the lens curve is spheric, toric or has a progressive shape. Thanks to the evenly pre-applied layer of HMA composition, the risk of optical distortion induced by the coating transfer process is greatly reduced. Thus, it is possible to transfer coatings on all kind of optical power lenses including lenses having a progressive surface with a very precise optical quality.

Generally, the thickness of the layer of the adhesive composition ranges from 0.5 to 30 μm and preferably from 0.5 to 20 μm more preferably 1 to 20 μm, even better 1 to 10 μm and optimally 5 to 10 μm once brought to a state at which the layer becomes unflowable under the process conditions.

Deposition of the HMA composition layer can be performed by any of the techniques known in the art, such as dip coating, flow coating, spin coating or dry transfer, preferably spin coating and spray coating.

Spin coating is preferred because it allows getting HMA layers with very even thicknesses.

By "hot-melt adhesive HMA", it is intended to mean a room temperature solid but flexible adhesive, which melts or drops in viscosity upon heating, and rapidly sets with cooling to create a bond. The HMA used in the present invention will not be flowable even after heating of step h) because it is laminated firstly in very tight conditions. So the variation of thickness of the HMA layer in the final lens, when coatings are transferred, will typically be less than 2 microns.

As previously indicated the final cured HMA layers of the invention are obtained from HMA compositions comprising at least one HMA based polymer having a glass transition temperature Tg and optionally a melting temperature Tm, with Tg<Tm, at least one polymerizable, preferably photopolymerizable, monomer, oligomer or polymer and optionally at least a solvent compatible both with the polymer and the polymerizable monomer, oligomer or polymer.

Preferred HMA base polymers have a Tg lower than 90° C., preferably ranging from −60° C. to 90° C., more preferably from 0° C. to 90° C., better from 40° C. to 90° C.

When the polymer possesses a Tg, if the Tg of the polymer is lower than 40° C., the resulting HMA layer tends to be less stable, especially if the Tg of the polymer is lower than 0° C. and even more lower than −60° C. If the Tg of the polymer is higher than 90° C. the process becomes difficult to implement.

HMA base polymer can be any known polymer for formulating a hot melt adhesive, but is preferably a thermoplastic polymer.

Thus, HMA base polymer can be chosen amongst polyolefines, polyamides, polyurethanes, polyurethane/ureas, polyvinypyrrolidones, polyesters, polyesteramides, poly(oxazolines) and poly(meth)acrylic systems.

Preferred HMA base polymers are poly(oxazolines), poly(meth)acrylic, polyurethane, polyurethane(ureas), polyolefines, copolymers from olefin and polyvinyl pyrrolidone, polyesteramides, polyesters.

Suitable polyolefines are disclosed in particular U.S. Pat. No. 5,128,388. Preferred polyolefines are block thermoplastic elastomers such as block elastomers comprising polystyrene blocks, polybutadiene blocks, polyisoprene blocks or ethylene-butylene copolymer blocks.

HMA base polymer can be a polyurethane in particular a dry polyurethane latex, such as a latex commercialized under trade names W-240 and W-234 by Baxenden.

A preferred class of HMA base polymers is comprised of the poly(meth) acrylic systems. Dry poly(meth)acrylic latexes, such as the acrylate latex commercialized under the name ACRYLIC LATEX A-639 by Zeneca can be used. Amongst the preferred poly(meth)acrylic systems there can be cited the poly(alkyl(meth)acrylates) and in particular the poly(alkylmethacrylates) such as poly(methylmethacrylates) and poly(butylmethacrylates).

Poly(meth)acrylic emulsions particularly preferred are emulsions like Joncryl™ emulsions such as Joncryl™ 1532, 8383, 1919, 1980, 1972, 1992.

Other preferred latexes are core/shell latexes such as those described in U.S. Pat. No. 6,503,631 and especially latexes based on alkyl(meth)acrylates such as butyl acrylate or butylmethacrylate.

Another preferred class of HMA base polymers is comprised of the poly(oxazolines).

These polymers comprise recurring units of formula

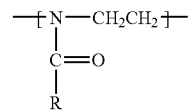

In which R is an alkyl, preferably a $C_1$-$C_4$ alkyl group or an aryl group, preferably a phenyl group.

Preferred poly(oxazolines) are poly(2-ethyl-2-oxazoline) and poly(2-ethyl-2-phenyl-oxazoline).

Such poly(oxazolines) are commercially available under the trade name AQUAZOL® (poly(2-ethyloxazoline)) and AQUAZOL HP/HVIS® (poly(2-ethyl-2-phenyl-2-oxazoline) from polymer Chemistry Innovations Inc.

The most preferred HMA base polymers are poly(alkyl (meth)acrylates), in particular poly(butylmethacrylates), and poly(oxazolines), in particular poly(alkyl oxazolines) and especially poly(2-ethyl-2-oxazoline).

The second important constituent of the HMA composition is a polymerizable, preferably a UV polymerizable, monomer, oligomer, polymer or a mixture of such monomers, oligomers or polymers.

Preferred second components are polymerizable monomer, oligomer or a mixture of such components.

Any photopolymerizable monomers and/or oligomers can be used in the HMA compositions. They preferably do not induce phase separation when they are mixed with the HMA base polymer alone or with a proper solvent.

Amongst the preferred photopolymerizable monomers and oligomers there may be cited monomers and oligomers comprising at least one, preferably two or more photopolymerizable functional groups such as (meth)acrylate groups, hydroxyl groups and carboxy groups.

Preferred monomers and oligomers are mono and poly (meth)acrylate compounds. Poly(meth)acrylate compounds are preferably di and tri(meth)acrylate compounds. Mixtures of mono and poly(meth)acrylate compounds, in particular mixtures of mono, di and/or tri(meth)acrylate compounds are preferred. Amongst the mono(meth)acrylate compounds there may be cited 2,4,6-tribromophenoxyethyl(meth)acrylate. Amongst di(meth)acrylate compounds there may be cited cyclohexane dimethanol diacrylate and bisphenol A dimethacrylates. Amongst triacrylate compounds there may be cited tris(2-hydroxyethyl) isocyanurate triacrylate.

An important requirement is that the polymerizable monomers and oligomers must be in liquid form at the $T_{maxprocess}$ temperature.

The polymerizable monomers and oligomers can be liquid at ambient temperature (i.e. a temperature of 20 to 25° C.) and in that case the HMA base polymer may be directly incorporated in the monomers and oligomers. These photopolymerizable monomers and oligomers can be solids at ambient temperature and thus a solvent or mixture of solvents can be used for preparing the HMA composition.

The solvent or mixture of solvents must be compatible both with the HMA base polymers and the monomers and oligomers.

Appropriate solvents are i.a. water, alcohols such as alkanols, ketones such as methylethylketones, esters such as alkylacetates, THF etc.

In general, the weight ratio polymerizable monomers and/or oligomers/HMA base polymers ranges from 95:5 to 5:95, preferably 80:20 to 20:80, even better 40:60 to 60:40.

The HMA composition may also includes at least one polymerizable initiator, in particular thermal or UV polymerization initiators.

It is of importance that the polymerization be initiated at or above the Tg temperature of the HMA base polymer.

In a first embodiment, the monomer or oligomer is thermally polymerizable.

Recommended thermal initiators are diacyl peroxides such as lauroyl peroxide (trade name Luperox LP), benzoyl peroxide (trade name: Luperox A98), peroxydicarbonates such as di(n-propyl) peroxydicarbonate (trade name Luperox 221), di(sec-butyl) peroxydicarbonate (trade name: Luperox 225V60), di(2-ethylhexyl) peroxydicarbonate (trade name Luperox 223S) Peroxyesters such as t-butyl peroxyneodecanoate Luperox 10 2,5-di(2-ethylhexanoylperoxy)-2,5-dimethylhexane, such as Luperox 256.

Classical thermal initiator like AIBN (azobisisobutyronitrile) may also be used.

The thermal initiator is added in usual amounts, namely from 0.1 to 5 parts by weight, preferably 1 to 5 parts by weight based on the total weight of HMA base polymer and the thermally polymerizable monomers and oligomers.

In a second and preferred embodiment, the monomer or oligomer is photopolymerizable.

As the photopolymerization initiator, any widely known compound can be used without limitation that is added for photopolymerizing the polymerizable monomers. Among the photopolymerization initiators that can be suitably used in the present invention, there may be cited benzophenone compounds, acetophenone compounds, α-dicarbonyl compounds, acylphosphine oxide compounds, bisacylphosphine oxide compounds and mixtures thereof.

More specifically speaking, photoinitiator compounds can be represented by the following formula:

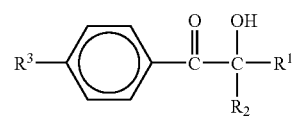

wherein $R^1$ and $R^2$ are alkyl groups which together may form a cyclohexane ring, and $R^{13}$ is an alkyl group or a hydrogen atom,

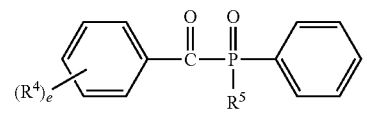

wherein $R^4$ is the same or different and is a methyl group, a methoxy group or a chlorine atom, e is 2 or 3, and $R^5$ is a phenyl group or methoxy group,

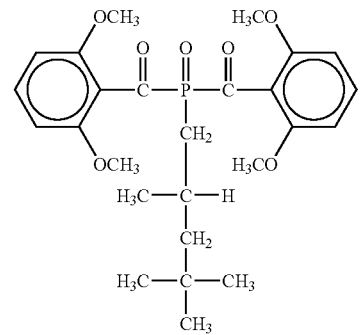

Examples of photopolymerization initiators than can be preferably used in the present invention are as described below:

Acetophenone Polymerization Initiators:
1) 1-Phenyl-2-hydroxy-2-methylpropane-1-one,
2) 1-Hydroxycyclohexylphenyl ketone, and
3) 1-(4-Isopropylphenyl)-2-hydroxy-2-methylpropane-1-one.

α-Dicarbonyl Compounds:
1) 1,2-Diphenylethanedione, and
2) Methylphenylglyoxylate.

Acylphosphine Oxide Photopolymerization Initiators:
1) 2,6-Dimethylbenzoyldiphenylphosphine oxide,
2) 2,4,6-Trimethylbenzoyldiphenylphosphine oxide,
3) Methyl 2,4,6-trimethylbenzoyldiphenylphosphinate ester,
4) 2,6-Dichlorobenzoyldiphenylphosphine oxide, and
5) 2,6-Dimethoxybenzoyldiphenylphosphine oxide.

These photopolymerization initiators can be used in a single kind or in a combination of two or more kinds.
Bisacylphosphine Oxide Photopolymerization Initiators:
1) Bis(2,6-dimethoxybenzoyl)-2,4,4-trimethylpentylphosphine oxide.

Among the preferred photo-initiators are the following photo-initiators:
Irgacure® 500
a 1/1 mixture of benzophenone and 1-hydroxycyclohexylphenyl.

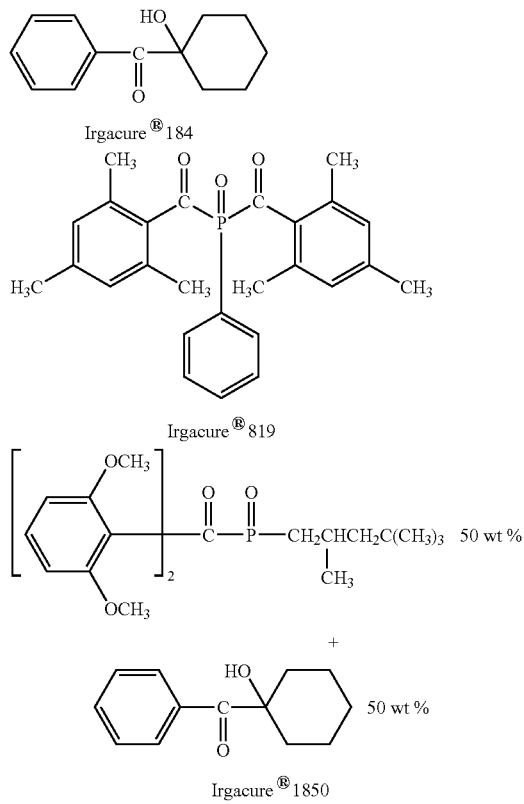

In the present invention, the photo-initiator is added in usual amounts, namely from 0.1 to 5 parts by weight, preferably 1 to 5 parts by weight based on the total weight of HMA base polymer and photopolymerizable monomers and oligomers.

Normally, the UV power could be in the range of 40 mW to 140 mW and the UV curing time could be 20 seconds to 10 minutes depending on the UV intensity being used.

The carrier, which bears the coating layers to be transferred, is a rigid or flexible carrier, preferably a flexible carrier. The flexible carrier is a removable carrier, i.e. a carrier that is intended to be removed at the end of the coating transfer process, so that only the coating or stack of coatings are transferred to the geometrically defined surface of the lens substrate after completion of the process. Preferred flexible carrier may be a thin supporting element made of a plastic material especially a thermoplastic material. Examples of thermoplastic (co)polymers, which can be used for making the carrier are polysulfones, aliphatic poly(meth)acrylates, such as methyl poly(meth)acrylate, polyethylene, polypropylene, polystyrene, SBM (styrene-butadiene-methyl methacrylate) block copolymers, polyphenylene sulfide, arylene polyoxides, polyimides, polyesters, polycarbonates such as bisphenol A polycarbonate, PVC, polyamides such as the nylons, other copolymers thereof, and mixtures thereof. The preferred thermoplastic material is polycarbonate. Such a removable flexible carrier generally has a thickness of 0.2 to 5 mm, preferably from 0.5 to 2 mm.

Usual functional coatings, as is well known, comprise anti-fouling top coats, anti-reflection coatings, anti-abrasion- and/or scratch-resistant coatings, impact-resistant coatings, polarized coatings, photochromic coatings, dyed coatings, printed layers, microstructured layers. Preferably, functional coatings used in the present invention are selected from the group consisting of an anti-fouling top coat, an anti-reflection coating, an abrasion- and/or scratch-resistant coating and an impact-resistant coating. Generally, the main surface of the carrier bears a stack of several functional coating layers. Ideally, said stack of several functional coatings comprises, starting from the carrier main surface an anti-fouling top coat layer, an anti-reflection coating (AR coating) layer, an abrasion- and/or scratch-resistant coating (hardcoat) layer and optionally an impact-resistant primer coating layer, these layers being deposited in this indicated order (reverse from the final order on the optical article). It is worth noting that the transparent adhesive composition layer may advantageously act as an impact-resistant primer coating. Then, it preferably fulfills the preferred requirements of impact resistant primer coatings, such as a Tg of less than 30° C., as described hereinafter.

It is also worth noting, that the coating or the outermost coating of the coating stack may be coated with a protecting and releasing coating, which acts to protect it and has to be removed before implementing the process of the invention.

The anti-fouling top coat, which in the finished optical article constitutes the outermost coating on the lens substrate, is intended for improving dirty mark resistance of the finished optical article and in particular of the anti-reflection coating.

As known in the art, an anti-fouling top coat is a layer wherein the stationary contact angle to deionized water is at least 60°, preferably at least 75° and more preferably at least 90°, and even better more than 100°. The most efficient anti-fouling top coats have a stationary water contact angle of 110° or more. The stationary contact angle is determined according to the liquid drop method in which a water drop having a diameter smaller than 2 mm is formed on the optical article and the contact angle is measured.

The anti-fouling top coats preferably used in this invention are those which have a surface energy of less than 14 m Joules/m². The invention has a particular interest when using anti-fouling top coats having a surface energy of less than 13 m Joules/m² and even better less than 12 m Joules/m².

The surface energy values referred just above are calculated according to Owens Wendt method described in the following document: Owens, D. K.; Wendt, R. G. "Estimation of the surface force energy of polymers", *J. Appl. Polym. Sci.* 1969, 51, 1741-1747.

Such anti-fouling top coats are well known in the art and are usually made of fluorosilicones or fluorosilazanes i.e. silicones or silazanes bearing fluorine-containing groups, which are both hydrophobic and oleophobic. Example of a preferred anti-fouling top coat material is the product commercialized by Shin Etsu under the name KP 801M.

The top coat may be deposited onto the carrier using any typical deposition process, but preferably using thermal evaporation technique.

Thickness of the anti-fouling top coat usually ranges from 1 to 30 nm, preferably 1 to 15 nm, more preferably 1 to 5 nm.

Anti-reflection coatings and their methods of making are well known in the art. The anti-reflection can be any layer or stack of layers which improves the anti-reflective properties of the finished optical article. The anti-reflection coating may preferably consist of a mono- or multilayer film of dielectric materials such as SiO, $SiO_2$ $Si_3N_4$, $TiO_2$, $ZrO_2$, $Al_2O_3$, $MgF_2$ or $Ta_2O_5$, or mixtures thereof.

The anti-reflection coating can be applied in particular by vacuum deposition according to one of the following techniques:

1)—by evaporation, optionally ion beam-assisted;
2)—by spraying using an ion beam,
3)—by cathode sputtering; or
4)—by plasma-assisted vapor-phase chemical deposition.

The anti-reflection coating can be applied by applying liquid solutions, preferably by a spin coating process.

In case where the anti-reflection coating includes a single layer, its optical thickness must be equal to λ/4, where λ is a wavelength of 450 to 650 nm. Preferably, the anti-reflection coating is a multilayer film comprising three or more dielectric material layers of alternatively high and low refractive indexes.

Of course, the dielectric layers of the multilayer anti-reflection coating are deposited on the carrier or the anti-fouling top coat in the reverse order they should be present on the finished optical article.

A preferred anti-reflection coating may comprises a stack of four layers formed by vacuum deposition, for example a first $SiO_2$ layer having an optical thickness of about 100 to 160 nm, a second $ZrO_2$ layer having an optical thickness of about 120 to 190 nm, a third $SiO_2$ layer having an optical thickness of about 20 to 40 nm and a fourth $ZrO_2$ layer having an optical thickness of about 35 to 75 nm.

Preferably, after deposition of the four-layer anti-reflection stack, a thin layer of $SiO_2$ of 1 to 50 nm thick (physical thickness) may be deposited. This layer promotes the adhesion between the anti-reflection stack and the abrasion- and/or scratch-resistant coating generally subsequently deposited, and is not optically active.

The next layer to be deposited is the abrasion- and/or scratch-resistant coating. Any known optical abrasion- and/or scratch-resistant coating composition can be used to form the abrasion- and/or scratch-resistant coating. Thus, the abrasion- and/or scratch-resistant coating composition can be a UV and/or a thermal curable composition.

By definition, an abrasion- and/or scratch-resistant coating is a coating which improves the abrasion- and/or scratch-resistance of the finished optical article as compared to a same optical article but without the abrasion- and/or scratch-resistant coating.

Preferred abrasion- and/or scratch-resistant coatings are those made by curing a precursor composition including epoxyalkoxysilanes or a hydrolyzate thereof, optionally colloidal mineral fillers and a curing catalyst. Examples of such compositions are disclosed in U.S. Pat. No. 4,211,823, WO Pat. No. 94/10230, U.S. Pat. No. 5,015,523, EP Pat. No. 614957.

The most preferred abrasion- and/or scratch-resistant coating compositions are those comprising as the main constituents an epoxyalkoxysilane such as, for example, γ-glycidoxypropyl-trimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions.

In order to improve the adhesion of the abrasion- and/or scratch-resistant coating to the impact-resistant primer coating to be subsequently deposited or to the transparent adhesive composition layer, an effective amount of at least one coupling agent can be added to the abrasion- and/or scratch-resistant coating composition. The preferred coupling agent is a pre-condensed solution of an epoxyalkoxysilane and an unsaturated alkoxysilane, preferably comprising a terminal ethylenic double bond.

Examples of epoxyalkoxysilanes are GLYMO, γ-glycidoxypropyl-pentamethyldisiloxane, γ-glycidoxypropyl-methyl-diisopropenoxysilane, γ-glycidoxypropyl-methyl-diethoxysilane, γ-glycidoxypropyl-dimethyl-ethoxysilane, γ-glycidoxypropyl-diisopropyl-ethoxysilane and γ-glycidoxypropyl-bis (trimethylsiloxy)methylsilane. The preferred epoxyalkoxysilane is GLYMO.

The unsaturated alkoxysilane can be a vinylsilane, an allylsilane, an acrylic silane or a methacrylic silane.

Examples of vinylsilanes are vinyltris(2-methoxyethoxy) silane, vinyltrisisobutoxysilane, vinyltri-tert-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxy-silane, vinylbis (trimethylsiloxy) silane and vinyldimethoxyethoxysilane.

Examples of allylsilanes are allyltrimethoxysilane, alkyltriethoxysilane and allyltris(trimethylsiloxy)silane.

Examples of acrylic silanes are 3-acryloxypropyltris(trimethylsiloxy) silane, 3-acryloxy-propyl-trimethoxysilane, acryloxy-propylmethyl-dimethoxysilane, 3-acryloxypropyl-methylbis(trimethylsiloxy) silane, 3-acryloxypropyl-dimethylmethoxysilane, N-(3-acryloxy-2-hydroxypropyl)-3-aminopropyl-triethoxysilane.

Examples of methacrylic silanes are 3-methacryloxypropyltris (vinyldimethoxylsiloxy) silane, 3-methacryloxypropyltris(trimethylsiloxy) silane, 3-methacryloxypropyltris (methoxyethoxy) silane, 3-methacryloxy-propyl-trimethoxysilane, 3-methacryloxypropyl-pentamethyldisiloxane, 3-meth-acryloxy-propyl-methyldimethoxysilane, 3-methacryloxy-propylmethyl-diethoxy-silane, 3-methacryloxypropyl-dimethyl-methoxysilane, 3-methacryloxy-propyl-dimethylethoxysilane, 3-methacryloxy-propenyl-trimethoxy-silane and 3-methacryloxy-propylbis (trimethylsiloxy)methylsilane.

The preferred silane is acryloxypropyl-trimethoxysilane.

Preferably, the amounts of epoxyalkoxysilane(s) and unsaturated alkoxysilane(s) used for the coupling agent preparation are such that the weight ratio:

$$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight. The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_k Si O_{(4-k)/2}$ where Q is the organic group that bears the epoxy or unsaturated group and $Q_k Si O_{(4-k)/2}$ comes from $Q_k Si R'O_{(4-k)}$ where Si—R' reacts to form Si—OH on hydrolysis.

k is an integer from 1 to 3 and is preferably equal to 1.

R' is preferably an alkoxy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprise:
1) mixing the alkoxysilanes
2) hydrolyzing the alkoxysilanes, preferably by addition of an acid, such a hydrochloric acid
3) stirring the mixture
4) optionally adding an organic solvent
5) adding one or several catalyst(s) such as aluminum acetylacetonate
6) Stirring (typical duration: overnight).

Typically, the amount of coupling agent introduced in the scratch-resistant coating composition represents 0.1 to 15% by weight of the total composition weight, preferably 1 to 10% by weight.

The abrasion- and/or scratch-resistant coating composition can be applied on the anti-reflection coating using any classical method such as spin, dip or flow coating.

The abrasion- and/or scratch-resistant coating composition can be simply dried or optionally pre-cured before application of the subsequent impact-resistant primer coating layer (which may be the transparent adhesive composition layer) or implementation of the process of the invention. Depending upon the nature of the abrasion- and/or scratch-resistant coating composition, thermal curing, UV-curing or a combination of both can be used.

Thickness of the abrasion- and/or scratch-resistant coating, after curing, usually ranges from 1 to 15 μm, preferably from 2 to 6 μm, preferably from 3 to 5 microns.

Before applying the impact resistant primer on the scratch-resistant coating, it is possible to subject the surface of the scratch-resistant coating to a corona treatment or a vacuum plasma treatment, in order to increase adhesion.

The impact-resistant primer coating can be any coating typically used for improving impact resistance of a finished optical article. Also, this coating generally enhances adhesion of the scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings.

(Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethylene glycol(meth)acrylate based compositions such as, for example, tetraethylene glycoldiacrylate, polyethylene glycol (200) diacrylate, polyethylene glycol (400) diacrylate, polyethylene glycol (600) di(meth)acrylate, as well as urethane (meth)acrylates and mixtures thereof.

Preferably the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names W-240 and W-234 by Baxenden.

In a preferred embodiment, the impact-resistant primer coating may also include an effective amount of a coupling agent in order to promote adhesion of the primer coating to the optical substrate and/or to the scratch-resistant coating. The same coupling agents, in the same amounts, as for the scratch-resistant coating compositions, can be used with the impact-resistant coating compositions.

The impact-resistant primer coating composition can be applied on the scratch-resistant coating using any classical method such as spin, dip, or flow coating.

The impact-resistant primer coating composition can be simply dried or optionally pre-cured before molding of the optical substrate. Depending upon the nature of the impact-resistant primer coating composition, thermal curing, UV-curing or a combination of both can be used.

Thickness of the impact-resistant primer coating, after curing, typically ranges from 0.05 to 30 μm, preferably 0.5 to 20 μm and more particularly from 0.6 to 15 μm, and even better 0.6 to 5 μm.

Given that the flexible carrier of the functional coating layers is intended to be withdrawn at the completion of the process, it may be first coated with a layer of release agent, which may optionally be removed at the end of the process of the invention. In one embodiment, the anti-fouling top coat defined above advantageously acts as a non-removable release agent layer.

The force applied in pressing step (g) of the inventive process can be obtained by applying pressure, in particular air pressure, or vacuum to the carrier. The applied pressure will typically range from 0.35 to 4.2 bar (5 to 60 psi), preferably 0.35 to 3 bar and better 0.35 to 2.1 bar (5 to 30 psi). When vacuum is used for creating the application force, the typically applied force may be above 5 Newtons, preferably above 10 Newtons, more preferably above 15 Newtons. Air pressure may be applied using an inflatable membrane apparatus as disclosed in international patent application WO 03/004255. A general description of a vacuum structure allowing transferring the coatings can be found in U.S. Pat. No. 4,242,162.

In order to improve the conformation of the carrier to the surface of the lens substrate on which the coatings have to be transferred, especially if the transfer is implemented on the front face of the lens substrate, one can use an additional means to increase the pressure on the carrier. Typically, one can use a pad, optionally deformable, which can conform to the general shape of the carrier and increase the pressure applied to the carrier.

Referring now to the drawing and in particular to FIGS. 1A to 1D, a lens substrate 1 having a concave surface 2 is placed on a supporting element (not represented) with its concave (rear) surface 2 facing upwardly. A flexible carrier 3, a main surface of which has been previously coated with at least one functional coating 4 and a dried layer of a HMA composition 5 according to the invention, is placed onto a supporting element (not represented) with the HMA composition layer facing downwardly.

Deposition of the at least one functional coating 4 and HMA composition layer 5 on the surface of the flexible carrier 3 can be done through any usual deposition process employed in the optical field, such as vacuum deposition, spin coating, flow coating, dip coating etc. . . . . Of course, the deposition process will depend on the nature of the coating layer or layers and of the HMA composition layer deposited on the surface of the flexible carrier 3.

Thereafter, the supporting elements are moved relatively to each other to bring into direct contact HMA composition layer 5 and the surface of the lens substrate 2, which are then pressed together in such a manner that the exerted pressure shall be insufficient to impart any deformation to the lens substrate 1. Heat is applied during pressing step (g).

The heating source can be an air oven, a hot water bath, IR heat source or microwave source. Heating time could be from few minutes to 30 minutes, for example heat is applied for 3 to 30 minutes.

Figure 1C:
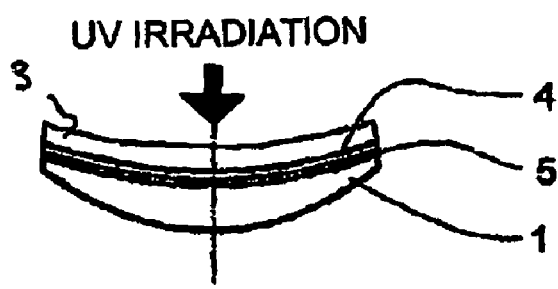
Figure 1D:
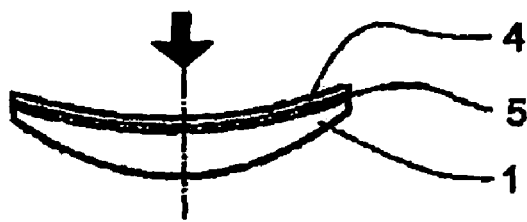

As shown in FIG. 1C, the assembly formed by the lens substrate 1, the HMA composition layer 5, the at least one functional coating 4, and the flexible carrier 3 is then irradiated by a UV light to polymerize the photopolymerizable monomers and oligomers. After irradiation, the pressure is released, the flexible carrier 3 is withdrawn and the lens substrate 1 having at least one functional coating 4 adhering to its concave surface 2 through the layer of adhesive composition 5 is recovered as shown in FIG. 1D.

It is possible to have short cycle thermal cure and UV cure.

The heating and UV curing step can typically be implemented in respectively 2 minutes and 1 minute.

An example of a short cycle for transfer or lamination conditions are the following:

Inflation profile: 120 seconds to reach 24 PSI (165.47 kPa).
Temperature of the flexible carrier: 80° C.
Time at temperature during pressure: 2 minutes
UV exposure: 1 minute
UV intensity: 30-31 mW/cm2
UV source: Dymax 5000 EC flood (400 W metal halide bulb).

An advantage of the present invention is that it is not necessary to wait for the temperature decrease of the final lens before removing the carrier, so the process is faster.

The following examples illustrate the present invention.

EXAMPLES

General Considerations

In the examples, the carrier is a polycarbonate (PC) carrier bearing on its convex surface a coating stack including, starting from the carrier, an anti-fouling top coat, an anti-reflection coating and an abrasion and/or scratch-resistant coating. A transparent adhesive composition layer also acting as an impact resistant primer composition is formed on the abrasion- and/or scratch-resistant coating. The assembly of the coating stack and the transparent adhesive composition layer is called the "HMC coating".

The PC carrier bearing the HMC coating is called the "HMC carrier".

Step 1: Deposition of a Protecting and Releasing Coating

The composition of the protecting and releasing coating is as follows:

TABLE 1

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |

TABLE 1-continued

| Component | Parts by weight |
|---|---|
| Coat-O-Sil 3503 (reactive flow additive) | 0.06 |
| Photoinitiator | 0.20 |

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System $H_+$ bulb at a rate of 1.524 m/minute (5 feet per minute).

This protecting and releasing coating will not be transferred and will stay on the carrier after transferring the HMC coating.

Step 2: Deposition of an Anti-Fouling Top Coat and Anti-Reflection (AR) Coating

The PC carrier after deposition of the protecting coating is vacuum coated as follows:

A/ Standard Vacuum AR Treatment: The Vacuum AR treatment is accomplished in a standard box coater using well known vacuum evaporation practices. The following is one procedure for obtaining the VAR on the carrier:

1. The carrier having the protective coating already applied on the surface is loaded into a standard box coater and the chamber is pumped to a high vacuum level.

2. Anti-fouling coating (Chemical=Shin Etsu KP 801M) is deposited onto the surface of the carrier using a thermal evaporation technique, to a thickness in the range of 2-15 nm.

3. The dielectric multilayer AR coating, consisting of a stack of sub-layers of high and low refractive index materials is then deposited, in reverse of the normal order. Details of this deposition are as such:

The optical thicknesses of the alternating low and high refractive index layers are presented in the table (They are deposited in the indicated order, from the carrier surface):

TABLE 2

| Low index | 103-162 nm |
|---|---|
| High index | 124-190 nm |
| Low index | 19-37 nm |
| High index | 37-74 nm |

A preferred stack, which is deposited in the examples, is a stack wherein the low index material is $SiO_2$ and the high index material is $ZrO_2$.

B/ At the completion of the deposition of the four-layer anti-reflection stack, a thin layer of $SiO_2$, comprising of a physical thickness of 1-50 nm, is deposited. This layer is intended to promote adhesion between the oxide anti-reflection stack and a lacquer hard-coating which will be deposited on the coated carrier at a later time.

Step 3: Deposition of a Hard Coat (HC) & Latex Primer Coating

The composition of the hard coating is as follows:

TABLE 3

| Component | Parts by weight |
|---|---|
| GLYMO | 21.42 |
| 0.1N HCl | 4.89 |
| Colloidal silica | 30.50 |
| Methanol | 29.90 |
| Diacetone alcohol | 3.24 |

TABLE 3-continued

| Component | Parts by weight |
| --- | --- |
| Aluminium acetylacetonate | 0.45 |
| Coupling agent | 9.00 |
| Surfactant FC-430 (3M company) | 0.60 |

The composition of the adhesive and impact resistant primer coating is as follows:

TABLE 4

| Component | Parts by weight |
| --- | --- |
| Polyurethane latex W-234 | 35.0 |
| Deionized water | 50.0 |
| 2-Butoxy ethanol | 15.0 |
| Coupling agent | 5.0 |

This primer coating composition is used as a hot melt adhesive composition in the following examples.

The PC carrier after deposition of protecting coating, antifouling coating, and AR coating in steps 1 and 2 is then spin coated by a HC solution at 600 rpm/1200 rpm, and pre-cured 10 minutes at 80° C., and again spin coated by the adhesive and impact resistant primer composition solution at the same speed and post-cured for 1 hour at 80° C. (This provides a dry latex layer having a thickness of about 1.8 to 2 microns).

The coupling agent is a pre-condensed solution of:

TABLE 5

| Component | Parts by weight |
| --- | --- |
| GLYMO (Glycidoxypropyltrimethoxysilane) | 10.0 |
| Acryloxypropyl-triméthoxysilane | 10.0 |
| 0.1 N HCl | 0.5 |
| Aluminum acetylacetonate | 0.5 |
| Diacetone alcohol | 1.0 |

Testing and Inspection Procedures:

Dry adhesion is measured using the cross-hatch adhesion test according to ISTM 02010, using 3M SCOTCH® no 600 transparent tape. 25 squares are formed. Adhesion is rated as follows:

TABLE 6

| Adhesion score | Squares removed | Area % left intact |
| --- | --- | --- |
| 0 | 0 | 100 |
| 1 | <1 | 96 |
| 2 | 1 to 4 | 96-84 |
| 3 | >4 to 9 | 83-64 |
| 4 | >9 to 16 | 63-36 |
| 5 | >16 | <36 |

The test called R-17 used for the inspection is in fact the transmission test described in detail in WO2006136757 (Protocole of measurement of optical defects) which is incorporated herein by reference.

In addition to the protocole, WO2006136757 describes in detail the apparatus used for the inspection.

Inspection with an arc lamp is carried out by using a BT XL 75/LIS//Lamp made by Bulbtronics Inc.

The light from the above lamp is directed towards the lens and the reflected light is projected on a screen. The image of the lens on the screen is visually inspected in order to see if there are optical defects.

General statements regarding the examples Implementing a HMC transfer process.

1. The liquid HMA compositions are prepared by dissolving the HMA base polymer in a solvent and thereafter mixing the photopolymerizable monomers/oligomers to obtain a solution. In some cases a photoinitiator is added, if needed.

2. The liquid HMA compositions are spin coated onto the exposed surface of the functional coatings borne by the HMC carrier with the spin condition of 400 rpm for 2 seconds and 1500 rpm for 8 seconds. After drying in room temperature for few hours, the resulting layer which is of very uniform thickness is dry of slightly tacky and can be used for implementation of the subsequent steps of the process.

3. The HMC carrier bearing the dried photopolymerizable (UV polymerizable) HMA layer is then used to transfer the HMC coating onto the concave main surface of a lens.

This main surface is a rough surface, i.e. a surface that has been grinded, fine grinded but not polished.

Transfer is implemented using an inflatable membrane apparatus as disclosed in WO 03/004255.

4. Unless otherwise stated, the pressure applied is around 1.38 bar (20 psi) and the heating temperature is around 80° C. and heating time is about 30 minutes.

5. Unless otherwise stated, irradiation is a UV light irradiation of 80 mW/cm$^2$ and a duration of about 1 minute.

Example 1

Transfer Process

A mixture solution of 0.55 g of polybutyl methacrylate, 5.0 g of tris(2-hydroxy ethyl) isocyanurate triacrylate, 2.0 g of 2,4,6-tribromophenylethoxy acrylate, and 0.1 g of photoinitiator Igacure® 819 in 4.0 g MEK was prepared. A coating using this solution was spin coated on the convex HMC side of carriers with 6 base curve. After drying, the coated carriers were placed onto rough and opaque Orma® lenses (+2.00) that were directly cut by a Schneider machine without polishing, and then the two pieces were laminated using the inflatable membrane pressing apparatus. Under pressure of 1.38 bar (20 psi), the lenses with the coated layer on the carriers were heated at 80° C. for 30 min. After in-situ UV curing using 120 W for 1.5 min, the assembly was taken out and cooled down. When the inflatable membrane apparatus and BST carrier were removed, optical clear lenses were obtained without any surfacing scratch marks seen by eye or in arc lamp. The lenses after this process have the same optical power of +2.00 as before checked by Humphery.

Table 7 show haze and surface clear level of the lenses before and after the process.

TABLE 7

| | LENS N° | | | |
| --- | --- | --- | --- | --- |
| Haze value (%) | 1 | 2 | 3 | Average |
| Directly cut lens | 42.0 | 41.3 | 40.8 | 41.4 |
| After coating transfer | 0.36 | 0.24 | 0.33 | 0.31 |

Thickness of HMA layer: 8 μm
Orma ® lens: lens made of CR-39 ® from PPG Industries (polymers of ethylene glycol bis(allylcarbonate)).

Example 2

Transfer Process

A mixture solution of 0.5 g of polybutyl methacrylate, 7.0 g of tris(2-hydroxy ethyl) isocyanurate triacrylate, 2.5 g of 2,4,6-tribromophenylethoxy acrylate, and 0.1 g of photoinitiator Igacure® 819 in 5.0 g THF was prepared. A coating using this solution was spin coated on the convex HMC side of a carrier with 7 base curve. After drying, the coated carrier was placed onto a fined concave surface of an Orma® lens (−2.00) that was cut by V-95 and fined with 15 μm pad without polishing, and then was set in the inflatable membrane apparatus. Under pressure of 1.38 bar (20 psi), the assembly was heated to a temperature between 80 and 85° C. for 30 min. After in-situ UV curing for 1 min, the device was taken out and cooled down. When the inflatable membrane apparatus and carrier were removed, a clear optical lens was obtained with no scratches seen by eye and no coating flow marks seen in arc lamp. The thickness of the HMA layer is 5 μm and thickness variation is under 1 μm on the entire lens surface, measured by microscope.

Examples 3 to 9

Transfer Process

Table 8 lists experimental formulations which were tested on CR-39® lenses, fined only with 15 μm, and finally 9 μm pads. The BST transfer process was done similar as Ex. 1-2. The obtained lens looked very clear and transparent without any fine mark or rough surface seen in R-17 inspection, arc lamp and mini-spot.

The obtained HMC transferred lens has very good adhesion with the crosshatch score 0. It has good hardness too.

TABLE 8

| Component | Ex. 3 | Ex. 4 | Ex. 5 | Ex. 6 | Ex. 7 | Ex. 8 | Ex. 9 |
|---|---|---|---|---|---|---|---|
| Aquazol ® 5 | 1.88 g | 2.25 g | — | 2.5 g | 2.5 g | 2.5 g | 2.5 g |
| Aquazol ® 200 | — | — | 1.51 | — | — | — | — |
| BP-A DMAc | — | — | — | — | — | 0.8 g-- | — |
| SR 368 | 4.02 g | 3.75 g | 4.32 g | 1.84 g | 1.09 g | 1.70 g | 1.09 g |
| CD 406 | — | — | — | — | 1.03 g | — | 1.03 g |
| BR 31 | 1.61 g | 1.50 g | 1.73 g | 0.66 g | 0.38 g | — | 0.38 g |
| MEK | 7.5 g | 7.5 g | 7.5 g | 5.0 g | 5.0 g | 5.0 g | 5.0 g |
| % polymer | 25 | 30 | 20 | 50 | 50 | 50 | 50 |
| % solids | 50 | 50 | 50 | 50 | 50 | 50 | 40 |

Aquazol 5 (molecular weight 5000)
Aquazol 200 (molecular weight 200,000)
BP-A DMAc = bisphenol-A dimethacrylate
SR 368 = Tris (2-Hydroxy Ethyl) Isocyanurate Triacrylate
CD 406 = Cyclohexane Dimethanol Diacrylate
BR 31 = tribromophenylethoxy acrylate
Aquazol: poly (2-ethyl-2-oxazoline)
Same Tg for Aquazol 5 and aquazol 200 (Tg = 69-71° C.).

Process Parameters
Lens: CR-39®, 5.5 base back curve, fined only with 9 μm pad by LOH cut and fining machine without polishing step.
Carrier: 6.0 base HMC
Pressure: 1.38 bar (20 psig) (fined only lenses)
Temperature: 85° C. for 30 minutes, then
UV lamp power: 80 mW/cm² for 1 minute Examples 10 to 15

Transfer Process

Coating transfers were performed as in examples 1 and 2 on CR-39® digitally surfaced lenses without polishing using the HMA compositions of Table 9.

The obtained lens looked very clear and transparent without any fine mark or rough surface seen in R-17 inspection, arc lamp and mini-spot

TABLE 9

| Component | Ex. 10 | Ex. 11 | Ex. 12 | Ex. 13 | Ex. 14 | Ex. 15 |
|---|---|---|---|---|---|---|
| Aquazol ® 5 | — | 2.5 g | — | — | 1.0 g | — |
| Aquazol ® 200 | 2.5 g | — | 2.5 g | — | — | — |
| poly(butyl methachrylate) | — | — | — | 2.5 g | — | 1.0 g |
| SR 368 | 1.17 g | — | — | 2.5 g | 0.27 g | 1.27 g |
| CD 406 | 1.33 g | 2.5 g | 2.5 g | — | 3.73 g | 2.73 g |
| 1173/819 initiator blend | 0.1 g | 0.1 g | 0.1 g | 0.1 g | 0.1 g | 0.1 g |
| MEK | 5.0 g | 7.5 g | 7.5 g | 7.5 g | 7.5 g | 7.5 g |
| % polymer | 50 | 50 | 50 | 50 | 20 | 20 |
| % solids | 40 | 40 | 40 | 40 | 40 | 40 |

Example 16

Transfer Process

Example 12 was reproduced, except using a traditional fined and polished Orma lens of +0.75 D power. The obtained lens shows a very good adhesion (dry crosshatch 0-1). Thanks to HMA-UV adhesive layer to make the AR stack in compression during the AR coating transfer, the lens presents also a very good thermal resistance of the AR stack (thermal critical temperature/Tc is 80 C), which is much higher than when using classical glue process.

Example 17

Transfer Process

Example 16 was reproduced, except using a traditional fined and polished polycarbonate lens of −2.00 D power. The obtained lens shows a very good adhesion and good optics.

Example 18

Transfer Process

Example 16 was reproduced except that a traditional fined and polished Thin & Light 1.67 plano lens and Thin & Light 1.67 lens was used and the surface of the poly thio-urethane lens material was pre-treated by corona before the coating transfer process. The obtained lens shows a very good adhesion and good optics too.

Example 19

Lamination Process to Make a Laminated Lens

The HMA UV formulation of example 12 was spin coated onto a polyurethane PU plano film, with a thickness of 0.86 mm and 6 base curve. After drying, the film with HMA UV adhesive layer was laminated onto an Orma lens of −0.75 D power. The lamination conditions were the same as Ex. 12. After heating, curing and edging, a PU film laminated Orma lens was obtained with good optics (+0.78 D after lamination) and cosmetics.

COMPARATIVE EXAMPLES

Comparative Ex. 1

A polymer film solution containing 100% of Aquazol® 5 was spin coated onto an HMC carrier. After drying, the coated HMC carrier was subjected to the transfer process as in Examples 1-2 except that no UV radiation was applied. The resulting lens had very rough, wrinkly HMC transfer. This shows that the UV cured monomer is important in imparting film uniformity during the HMC layer transfer.

Comparative Ex. 2

A commercial acrylic UV glue formulation (OP-40) from Dymax Co was used to replace the HMA adhesive used in Ex. 16. The curing process was conducted in the same way as Ex. 16 without heating because no heating is needed in the UV cure process. The obtained lens shows a very AR good transfer and good dry adhesion, but has low thermal resistance of AR stack (Tc is around 50 to 60° C.).

Examples 20 to 21

Example 1 was reproduced except
that the HMA adhesive was replaced by a composition comprising a mixture of a 1:1 by weight of a UV curable oligomer (UV curable polyurethane dispersion-water based) Bayhydrol UV 2282 available from Bayer.
The heating is implemented at 80° C. during 2 minutes. The UV cure is implemented during 1 minute.
Adhesion properties are measured and reported in table 11.

TABLE 10

|  | HMA base polymer | S.C[1] | Tg (° C.) | Dry crosshatch Adhesion | | |
|---|---|---|---|---|---|---|
|  |  |  |  | Orma® lens | 1.6 index lens | 1.67 index lens |
| Ex. 20 | Joncryl™ 1532 | No | 12 | 1 | 1 | 1 |
| Ex. 21 | Joncryl™ 8383 | Yes | 14 | 1 | 1 | 0 |
| Ex. 22 | Joncryl™ 1980 | Yes | 69 | 0 | 1 | 1 |
| Ex. 23 | Joncryl™ 1972 | Yes | 78 | 0 | 3 | 1 |
| Ex. 24 | Joncryl™ 1992 | No | 78 | 0 | 0 | 0 |
| Ex. 25 | Witcobond W240™ | Yes |  | 1 | 2 | 2 |

[1]SC means self-crosslinking
1.6 refractive index and 1.67 refractive index are polythiourethane lenses respectively made from MR8™ and MR7™ materials from Mitsui.
The Joncryl™ HMA base polymers are acrylic emulsions which can be self crosslinking or not and are supplied by S. C. Jonhson.
Joncryl 1532 is an acrylic/styrene copolymer.

Examples 26 to 31

Example 20 is reproduced except that the Bayhydrol is replaced by a UV curable water based urethane oligomer Neorad™ R440. A supplier of this component is DSM. Different Joncryl HMA base polymers are used.

TABLE 11

|  | HMA base polymer | S.C[1] | Tg (° C.) | Dry crosshatch Adhesion | | |
|---|---|---|---|---|---|---|
|  |  |  |  | Orma® lens | 1.6 index lens | 1.67 index lens |
| Ex. 26 | Joncryl™ 1532 | No | 12 | 1 | 0 | 0 |
| Ex. 27 | Joncry™ 8383 | Yes | 14 | 2 | 1 | 2 |
| Ex. 28 | Joncryl™ 1919 | No | 29 | 0 | 1 | 1 |
| Ex. 29 | Joncryl™ 1980 | Yes | 69 | 1 | 1 | 0 |
| Ex. 30 | Joncryl™ 1972 | Yes | 78 | 1 | 3 | 1 |
| Ex. 31 | Joncryl™ 1992 | No | 78 | 0 | 0 | 0 |

[1]SC means self-crosslinking

Examples 32 to 37

Examples 26 to 31 are reproduced except that the Neorad™ is replaced by an UV curable aliphatic aqueous urethane acrylate oligomer dispersion Laromer™ LR8949. This product is available from BASF.

TABLE 12

|  | HMA base polymer | S.C[1] | Tg (° C.) | Dry crosshatch Adhesion | | |
|---|---|---|---|---|---|---|
|  |  |  |  | Orma® lens | 1.6 index lens | 1.67 index lens |
| Ex. 32 | Joncryl™ 1532 | No | 12 | 0 | 0 | 1 |
| Ex. 33 | Joncryl™ 8383 | Yes | 14 | 2 | 2 | 2 |
| Ex. 34 | Joncryl™ 1919 | No | 29 | 0 | 1 | 1 |
| Ex. 35 | Joncryl™ 1980 | Yes | 69 | 1 | 2 | 2 |
| Ex. 36 | Joncryl™ 1972 | Yes | 78 | 0 | 0 | 1 |
| Ex. 37 | Joncryl™ 1992 | No | 78 | 0 | 1 | 1 |

[1]SC means self-crosslinking

The invention claimed is:
1. A process for applying a coated or uncoated film onto at least one geometrically defined surface of a lens substrate, comprising:
 (a) providing a liquid hot melt adhesive (HMA) composition comprising:
  at least one HMA base polymer having a glass transition temperature Tg; and
  at least one polymerizable monomer, oligomer or polymer;
 (b) providing a film having two opposite main surfaces: a first main surface and a second main surface;
 (c) providing a lens substrate having at least one geometrically defined surface;
 (d) applying the liquid HMA composition onto either the surface of said film or said at least one geometrically defined surface;
 (e) drying the applied liquid HMA composition to form a HMA dried layer in contact with said at least one of the main surfaces of said film or said at least one geometrically defined surface of the lens substrate;
 (f) moving the film and the lens substrate relatively to each other to bring the HMA dried layer into contact with either said at least one geometrically defined surface of the lens substrate or one of said main surfaces of said film;

(g) applying a pressure on the film;

(h) heating to reach a $T_{max\ process}$ temperature at or above the glass transition temperature (Tg), but below the melting temperature Tm, if the polymer exhibits a Tm, the monomers or oligomers being liquid at the $T_{max\ process}$ temperature;

(i) polymerizing the monomers, oligomers or polymers, while maintaining pressure and heating; and (j) removing the pressure applied on the carrier, and recovering the lens substrate with the film adherent to said lens substrate main surface.

2. The process of claim 1, wherein the HMA base polymer has a melting temperature Tm, and Tg<Tm.

3. The process of claim 1, wherein the at least one polymerizable monomer, oligomer or polymer is UV polymerizable.

4. The process of claim 1, wherein the liquid HMA composition further comprises at least one liquid solvent compatible with both said at least one polymer and said at least one polymerizable monomer, oligomer or polymer.

5. The process of claim 1, wherein said liquid HMA composition comprises at least one polymerizable monomer or oligomer.

6. The process of claim 5, wherein the at least one polymerizable monomer or oligomer is photopolymerizable.

7. The process of claim 6, wherein the at least one polymerizable monomer or oligomer is UV polymerizable.

8. The process of claim 1, wherein the first main surface of said film bears at least one functional coating.

9. The process of claim 8, wherein step d) comprises applying the liquid HMA composition onto either said at least one geometrically defined surface of the lens substrate or said functional coating of said first main surface of said film.

10. The process of claim 9, comprising (k) withdrawing the film to recover the lens substrate coated with said at least one functional coating adhering to said at least one geometrically defined surface through a HMA cured layer.

11. The process of claim 9, wherein step d) comprises applying the liquid HMA composition onto said functional coating of said first main surface of said film.

12. The process of claim 11, comprising (k) withdrawing the film to recover the lens substrate coated with said at least one functional coating adhering to said at least one geometrically defined surface through a HMA cured layer.

13. The process of claim 1, wherein step i) comprises irradiating the monomers or oligomers with an actinic radiation.

14. The process of claim 13, wherein irradiating with an actinic radiation comprises irradiating with UV light.

15. The process of claim 1, wherein the at least one monomer or oligomer is thermally polymerizable.

16. The process of claim 1, wherein said at least one HMA base polymer is a thermoplastic polymer.

17. The process of claim 1, wherein said at least one HMA base polymer has a Tg ranging from 40 to 90° C.

18. The process of claim 1, wherein the HMA composition comprises at least one liquid solvent and at least some monomers or oligomers which are solid at ambient temperature but solubilized at ambient temperature by said at least one solvent.

19. The process of claim 1, wherein said at least one HMA base polymer is solubilized by liquid monomers and/or oligomers.

20. The process of claim 1, wherein said at least one HMA base polymer is a polyolefine, polyamide, polyurethane, polyurethane/urea, polyvinyl pyrrolidone, polyester, polyesteramide, poly(meth)acrylic, or poly(oxazoline).

21. The process of claim 1, wherein said at least one monomer or oligomer is a mono or poly(meth)acrylate compound.

22. The process of claim 1, wherein the weight ratio of photopolymerizable monomers and/or oligomers to HMA base polymers is from 95:5 to 5:95.

23. The process of claim 22, wherein the weight ratio of photopolymerizable monomers and/or oligomers to HMA base polymers is from 80:20 to 20:80.

24. The process of claim 22, wherein the weight ratio of photopolymerizable monomers and/or oligomers to HMA base polymers is from 60:40 to 40:60.

25. The process of claim 1, wherein the geometrically defined surface of the lens substrate is under polished state.

26. The process of claim 1, wherein the geometrically defined surface of the lens substrate has been ground and fined but not polished.

27. The process of claim 26, wherein Rq of the geometrically defined surface of the lens substrate is above or equal to 0.01 μM.

28. The process of claim 27, wherein Rq of the geometrically defined surface of the lens substrate is from 0.05 μm to 1 μm.

29. The process of claim 1, wherein the geometrically defined surface of the lens substrate has been digitally ground and not polished.

30. The process of claim 29, wherein Rq of the geometrically defined surface of the lens substrate is higher than 0.05 μM and less than 1 μm.

31. The process of claim 30, wherein Rq of the geometrically defined surface of the lens substrate is higher than 0.05 μm and less than 0.4 μm.

32. The process of claim 1, wherein $T_{max\ process}$ is lower than 130° C.

* * * * *

UNITED STATES PATENT AND TRADEMARK OFFICE
CERTIFICATE OF CORRECTION

PATENT NO. : 8,202,392 B2
APPLICATION NO. : 12/278494
DATED : June 19, 2012
INVENTOR(S) : Peiqi Jiang et al.

Page 1 of 1

It is certified that error appears in the above-identified patent and that said Letters Patent is hereby corrected as shown below:

In claim 27, column 28, line 35, delete "µM" and insert --µm-- therefor.

In claim 30, column 28, line 44, delete "µM" and insert --µm-- therefor.

Signed and Sealed this
Sixteenth Day of October, 2012

David J. Kappos
*Director of the United States Patent and Trademark Office*